US010264547B1

(12) United States Patent
Zhong et al.

(10) Patent No.: US 10,264,547 B1
(45) Date of Patent: *Apr. 16, 2019

(54) SELECTIVE NOTIFICATION DELIVERY BASED ON USER PRESENCE DETECTIONS

(71) Applicant: Amazon Technologies, Inc., Seattle, WA (US)

(72) Inventors: Gary Zhong, Milpitas, CA (US); Milo Oostergo, Issaquah, WA (US); Aakarsh Nair, Redmond, WA (US); Jonathan Alan Leblang, Menlo Park, CA (US); Collin Charles Davis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,662

(22) Filed: Aug. 8, 2018

Related U.S. Application Data

(63) Continuation of application No. 15/839,259, filed on Dec. 12, 2017, now Pat. No. 10,051,600.

(51) Int. Cl.
| | | |
|---|---|---|
| *H04M 1/725* | (2006.01) | |
| *H04W 68/00* | (2009.01) | |
| *H04W 4/02* | (2018.01) | |
| *G10L 15/30* | (2013.01) | |
| *G06F 17/30* | (2006.01) | |
| *H04W 4/80* | (2018.01) | |

(52) U.S. Cl.
CPC .... *H04W 68/005* (2013.01); *G06F 17/30766* (2013.01); *G06F 17/30864* (2013.01); *G10L 15/30* (2013.01); *H04W 4/02* (2013.01); *H04W 4/80* (2018.02)

(58) Field of Classification Search
CPC ... H04M 1/725; H04W 88/02; H04W 68/005; H04W 4/02; H04W 4/80; H04W 68/00; H04W 4/00; H04L 9/32; H04L 12/28; G10L 15/30; G06F 17/30766; G06F 17/30864; G06F 17/30
USPC .......................................... 455/412.2, 456.3
See application file for complete search history.

(56) References Cited

U.S. PATENT DOCUMENTS

| | | | | |
|---|---|---|---|---|
| 6,535,131 B1* | 3/2003 | Bar-Shalom | ......... | A01K 11/008 340/573.1 |
| 9,245,433 B1* | 1/2016 | Butler | ................... | H04W 4/029 |
| 2009/0189983 A1* | 7/2009 | Brumfield | ........ | G08B 13/19613 348/159 |

(Continued)

FOREIGN PATENT DOCUMENTS

| | | | | | |
|---|---|---|---|---|---|
| WO | WO-2007008312 A2 | * | 1/2007 | ............ | H04W 88/02 |
| WO | WO-2017054871 A1 | * | 4/2017 | ............ | H04L 67/22 |

*Primary Examiner* — Mahendra Patel
(74) *Attorney, Agent, or Firm* — Knobbe, Martens, Olson & Bear, LLP

(57) ABSTRACT

Systems and methods are disclosed related to determining a likelihood that a user is present in physical proximity to one or more computing devices based on factors such as detecting the user's voice, receiving beaconing signals from a user's mobile device, location information sent from other devices, input received via a camera, and/or other input at various devices that are geographically dispersed. Based on user presence information, a system may determine whether to broadcast a notification for the user to a given device for audible or visual presentation by the device.

20 Claims, 6 Drawing Sheets

(56) References Cited

U.S. PATENT DOCUMENTS

| | | | |
|---|---|---|---|
| 2012/0290215 A1* | 11/2012 | Adler | G16H 50/30 |
| | | | 702/19 |
| 2014/0143064 A1* | 5/2014 | Tran | A61B 5/0022 |
| | | | 705/14.66 |
| 2016/0066145 A1* | 3/2016 | Pietraniec | H04W 4/021 |
| | | | 455/456.3 |
| 2016/0366330 A1* | 12/2016 | Boliek | G06F 3/0484 |
| 2017/0265001 A1* | 9/2017 | Lombardi | H04L 12/2838 |
| 2017/0277361 A1* | 9/2017 | Schulze | G06F 9/451 |

* cited by examiner

| Timestamp | Device Name | Recorded Detection | Notifications |
|---|---|---|---|
| 6:00 am ET | Bedside VA 270 | Voice received – identified as John Doe | |
| 6:27 am ET | Kitchen VA 272 | Movement detected via camera input | "You have two meetings and two tasks for the day" |
| 6:45 am ET | Car VA 276 | Car VA sends beaconing signal; John's Mobile Device responds | |
| 7:07 am ET | Office VA 278 | Office VA detects logging in with John's organizational credentials | |
| 8:30 am ET | | | "Meeting 'Discuss Presentation Slides for Quarterly Performance' in 30 minutes" |
| 9:00 am ET | | | "Would you like to join the meeting 'Discuss Presentation Slides for Quarterly Performance?'" |
| 10:57 am ET | Conference Room VA 280 | Conference Room VA sends beaconing signal; John's Employee Badge responds | "Quarterly Review Meeting' was cancelled five minutes ago by CEO" |
| 2:28 pm ET | Mobile Device 274 | Geopositioning (Boston Airport) | |
| 5:30 pm ET | | | "Pick up laundry" |
| 6:00 pm ET | | | "Empty trash" |
| 10:39 pm ET (7:39 pm PT) | Mobile Device 274 | Geopositioning (LA Airport) | |
| 11:05 pm ET (8:05 pm PT) | Hotel Room VA 282 | Checked into a hotel room with a card key | |
| 12:00 am ET (9:00 pm PT) | | | "Tomorrow's meeting on 'New Widget Promo' is scheduled at 10:00 am PT at LA Convention Center." |

FIG. 2A

| Notifications | Confidence Levels for John's Presence at Each Device Associated with John | | | | | | |
|---|---|---|---|---|---|---|---|
| | Bedside VA | Kitchen VA w/ camera | John's Mobile Device | Car VA | Office VA | Conference Room VA w/ Beaconing | Hotel Room VA |
| Daily briefing | 30% | 90% | 0% | --- | --- | --- | --- |
| Meeting reminder | 10% | 20% | 80% | 2% | 95% | --- | --- |
| Meeting invitation | 0% | 10% | 30% | --- | 100% | --- | --- |
| Meeting cancellation | 0% | 0% | 80% | --- | 10% | 100% | --- |
| Pick up laundry | 0% | 0% | 0% | --- | --- | --- | --- |
| Empty trash | 0% | 0% | 0% | --- | --- | --- | --- |
| Tomorrow's schedule | 0% | 0% | 80% | --- | --- | --- | 95% |

| Notifications | Confidence Levels for Jane's Presence at Each Device Associated with Jane | | |
|---|---|---|---|
| | Bedside VA | Car VA | Jane's Mobile Device |
| Pick up laundry | 0% | 80% | 90% |
| Empty trash | 0% | 5% | 5% |

FIG. 2B

SELECTIVE NOTIFICATION DELIVERY BASED ON USER PRESENCE DETECTIONS

CROSS-REFERENCE TO RELATED APPLICATION

This application is a continuation of and claims benefit of priority to U.S. patent application Ser. No. 15/839,259, filed Dec. 12, 2017, entitled "SELECTIVE NOTIFICATION DELIVERY BASED ON USER PRESENCE DETECTIONS," which is hereby incorporated herein by reference in its entirety.

BACKGROUND

Joining a scheduled telephone, videoconferencing or in-person meeting on time can be challenging. Currently, meeting participants typically rely on client applications that include calendar functionality to remind them that a meeting is about to start. However, there are circumstances in which a given client application operating on a meeting participant's computing device may not have retrieved the latest calendar changes in time to notify the participant of any updates to the meeting. As another example, a participant may temporarily be away from a computing device that operates the relevant application.

A distributed system may provide remote clients with access to various services that are implemented largely within the distributed system and that are accessible via a network (which may be considered cloud-based services). The types of devices that can access cloud-based services continue to expand and diversify, including desktop computing devices, mobile devices such as smartphones and tablets, voice-capturing devices, home automation devices, and various other types of network-capable devices that are part of the "Internet of Things" (IoT). By accessing cloud-based services, a diverse universe of devices may access additional functionality or computing power not available locally on the devices.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 2A is an illustrative table listing collected activity and interaction data from various virtual assistant devices using various detection mechanisms ordered according to their detection times, as well as scheduled notifications for delivery at given times.

FIG. 2B is an illustrative table representing example confidence scores for the scheduled notifications in FIG. 2A, in accordance with some embodiments.

DETAILED DESCRIPTION

Generally described, aspects of at least some embodiments of the present disclosure relate to determining a user's likely presence in proximity of one or more devices capable of detecting some activity or interaction of the user, and selecting a device with a sufficient chance of successfully presenting a notification to the user at a given time based on the determined user presence. A detecting device and/or delivery device may be a virtual assistant device (sometimes referred to herein as a "VA device") in some embodiments, as will be described in more detail below. A notification may often be of time critical information, such as alerting the user that he is scheduled to join a meeting starting at the current time or within a very short time (such as in one minute).

As an example, a user may at various times interact with a number of different user devices, such as virtual assistant devices that will be described herein. He may use some devices that are not often moved and have a relatively static geographic location (such as devices located in various rooms in his home or at his office), as well as other devices that may change position frequently (such as a mobile phone, laptop computer, or in-car device). When a reminder or other notification is to be delivered to the user, such as an audible notification or visual notification, each of these devices may be a candidate for delivery of the notification. However, presenting the notification at all of the user's devices may be undesirable in many circumstances.

For example, if a meeting notification relates to a confidential meeting, it is undesirable to present this notification via a device located somewhere that the user is not currently located (such as at the user's office when the user is elsewhere), particularly if another person who should not be aware of this meeting or who is at least not authorized to call in to the meeting may be in proximity of the given device. Aspects of the present disclosure enable selective delivery of a notification by a subset (or by a single device) of a number of candidate devices based on determined confidence scores that each indicate a likelihood that the intended user is physically located in proximity of a given device at a time that a notification is to be delivered.

Example Environment

Figure 1:
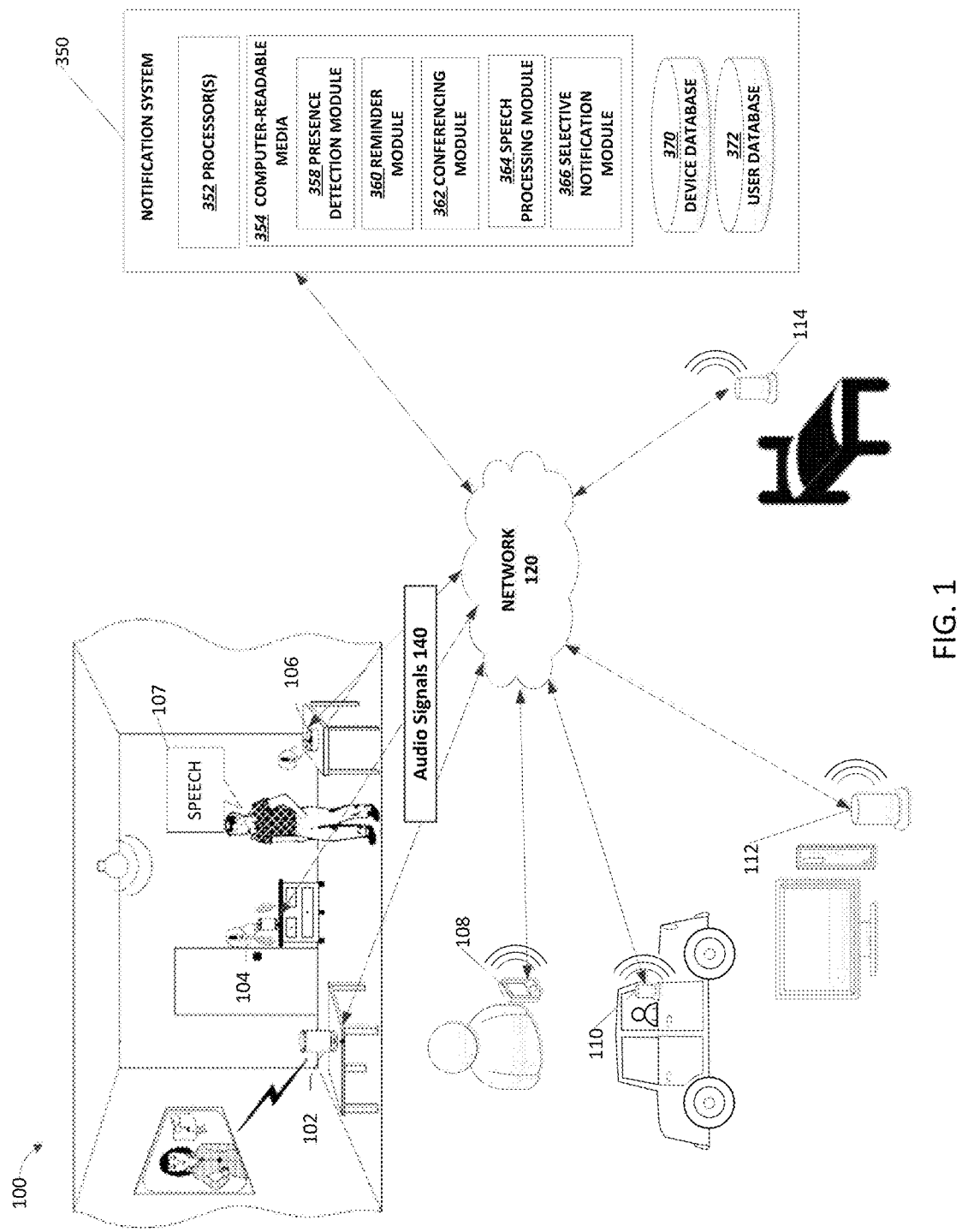
FIG. 1 illustrates an example networked environment in which various virtual assistant devices and a notification system may be implemented according to some embodiments.

FIG. 1 illustrates an example networked environment 100 in which various VA devices 102, 104, 106, 108, 110, 112, and 114, and a notification system 350 may be implemented, according to some embodiments. VA devices may provide a user with a wide variety of services including weather, remote controlling of music or movie applications, hands free navigation, and/or other features depending on the location and context. Generally, these devices are controlled by a user through recognition of voice commands. The devices receive commands and may parse the commands internally or transfer the commands to an external computing system, such as a server or a cloud environment, for processing. The transferred commands may be parsed internally before the transmission or parsed at the external computing system. While an external processing system (such as a server or service that processes and responds to voice commands from a number of different VA devices over the network 120) is not illustrated in FIG. 1, the notification system 350 may be part of or otherwise associated with such a system or may provide such functionality itself.

VA devices are expanding their numbers and reach. The devices may be located in various places, including at home (such as VA devices 102, 104 and 106), integrated within a mobile phone or tablet device 108, in a car (such as VA device 110), at an office (such as VA device 112), in a hotel room (such as VA device 114), integrated in a wearable device such as a smart watch (not shown), and/or other locations. Other suitable devices may include desktop and laptop computing devices, smartphones, tablets, voice-capturing devices such as smart speakers, smart appliances, and/or other "Internet of Things" (IoT) devices. Functionalities or "skills" may be offered to devices by a cloud-based service provider environment to implement particular tasks requested by the devices. A device may be associated with a device-specific account in the service provider environment.

One or more of the VA devices may include voice-capturing devices (also referred to as voice-capturing endpoints) and/or "smart speakers" that are configurable to stream or send voice input to the network-accessible voice-based service provided by a service provider environment. In response, the voice-based service(s) may take one or more actions, such as invoking one or more of the skills, and/or stream voice output back to the originating device for playback on that device. The actions and/or voice output may vary based on the skills of the service provider environment that are enabled for the particular device. Skills or functionalities that are responsive to voice input from VA devices may be referred to as voice-enabled skills or voice-enabled functionalities. In various embodiments, the skills provided by the service provider environment may include, for example, scheduling conference calls; identifying a speaker during a conference call; acting as a scheduling assistant; providing calendaring services, recording a meeting; accessing calendars, phone directories, or e-mail; creating, scheduling, and/or modifying tasks; and so on. In one embodiment, some of the VA devices may be satellite devices that are configured to connect to a central device over a local area network, e.g., to send voice input to the central device, and the central device may then connect to the service provider environment. By accessing cloud-based services of the service provider environment, the devices may access additional functionalities or other resources not available locally on the devices.

As illustrated with VA devices 102, 104 and 106, more than one VA device may be located in a same defined space, such as a home or a living room, to provide additional coverage. Virtual assistant functionality may be associated with dedicated hardware (such as illustrated with at least standalone VA devices 102, 104 and 106), or may be implemented within a software application sharing processing power and storage with other applications in a computing system. A mobile phone or tablet device 108, for instance, may operate a virtual assistant application, or such functionality may be provided by or integrated with an operating system of the device 108.

The various VA devices may have one or more sensing mechanisms (or more broadly, data collection mechanisms) to collect data associated with a user, a user's activity, or a user's interaction with the VA devices. According to aspects of the present disclosure, methods of detecting a user's activity or interaction may be similarly used to detect or infer a user's inactivity and lack of interaction. For example, a VA device equipped with a camera may detect a user's activity as the user walks past the VA device. On the other hand, when the VA device does not detect such user movement for some extended time, the VA device may be considered to have detected a user's inactivity with respect to that device. Various types of sensing mechanisms and related components will further be described with respect to FIG. 3.

In the illustrated embodiment of FIG. 1, the VA devices can communicate with a notification system 350 over a network 120. The VA devices may inform the notification system 350 regarding sensed or captured user activities or interactions. As will be disclosed further below, the sensed user activities or interactions may be of various types and have various associated data types. For example, an activity detected in association with a camera-equipped VA device may be associated with an image or a video file. As another example, a GPS-equipped mobile VA device may send GPS coordinates to the notification system 350.

In some embodiments, a given VA device may collect audio signals, such as audio signals 140, via a microphone. The audio signals may include any sounds that a user may cause, both verbal and non-verbal. Verbal audio signals may be user utterances (such as user utterance 107), including voice commands directed to the VA device or speech directed to another person. Non-verbal audio signals may include, for example, scraping a carpet, toilet flushes, or a garage door opening. The audio signals may be raw audio signals or processed audio signals. Such processing may include, for instance, increasing fidelity or otherwise cleaning up a recorded audio signal before applying speech recognition or other further analysis of the recorded audio.

In some embodiments, audio processing may also include identifying metadata associated with the audio signals (such as identifying the speaker or identifying a type of sound). The metadata may be transmitted in association with the audio signals 140 to the network 120. In some embodiments, as noted, the VA device may parse and otherwise process the audio signals 140, then transmit only the extracted content and metadata to the notification system 350. In other embodiments, the notification system 350 or some other third party hardware or service may perform the parsing and other analysis of an audio recording.

The notification system 350 may include one or more processors 352 and computer-readable media 354. The notification system 350 may also include one or more internal or external databases containing data about associated VA devices (such as device database 370) and/or user profiles (such as user database 372). As one may readily appreciate, devices identified in the device database 370 and users identified in the user database 372 may be associated to indicate that a certain user owns or, alternatively, has access to a particular VA device. The association may be one-to-none, one-to-one, one-to-many, or many-to-many. For example, as illustrated with respect to FIG. 2B, two users Jane and John may have association with one or more VA devices, such as a car-integrated VA device 276 or kitchen VA device 272. Such associations may be permanent or temporary. For instance, a living room VA device 104 is likely to have a permanent association with a user (such as the homeowner), while a hotel room VA device 114 may no longer be associated with a particular hotel guest once the guest checks out of the hotel.

As one may appreciate, the associations in the databases, by themselves, are not informative to the determination of a user's physical proximity to the VA devices. For a successful determination of the user's presence and an effective delivery of a time critical notification, the notification system 350 relies on its modules and/or components to analyze collected data and make a determination of a user's likely location.

The computer-readable media 354 may include various software or hardware modules that perform various methods described herein to determine user presence and deliver notifications accordingly. In the illustrated embodiment, the modules include presence detection module 358, reminder module 360, conferencing module 362, speech processing module 364, and selective notification module 366. The notification system 350 receives the sensing data from various VA devices over the network 120. With the received data, the presence detection module 358 may determine a likelihood that a user is located in proximity to individual devices, either continuously or at some predefined times, depending on the embodiment. The reminder module 360 and/or conferencing module 362 may inform the notification system 350 of the notification content to deliver. The selective notification module 366 may select one or more of the suggested VA devices for notification delivery and cause the notification system 350 to deliver data containing the notification over the network 120 to one or more selected VA devices.

As described, the presence detection module 358 may generally provide information on where (such as in proximity to which device) a user is likely located at a given time. The reminder module 360 may include time information and content information for a notification. As a simple example, an alarm may be one such reminder, where the notification system 350 may provide a waking up stimulus (such as playing a sound or generating audible speech) to a user at a defined time, such as 6:00 am. However, a reminder may be more flexible with respect to time in other instances. An example reminder may be "empty trash on Thursday evening" which associates the reminder with a block of time on every Thursday evening. Some reminders may be a one-time only or a repeat reminder. The conferencing module 362 may also provide time-related information, such as a meeting scheduled for a certain time. In some embodiments, the reminder module 360 and conferencing module 362 may share access to a time-event database, or may access independent databases.

Each of the reminder module 360 and conferencing module 362 may have, in addition to the time-related information, some content (including metadata) or context associated with the time-related information. For example, a reminder to "pick up kids after school" may have associated geographic location of the school or a time when the school gets out. A conferencing notification may include a subject of a meeting, meeting participants, meeting location, participant e-mail addresses, participant role in an organization, etc. Example metadata may include an importance of a reminder, which may be described with qualitative degrees (such as "low, medium, high") or quantitative degrees (such as a number ranging from 1-10). In some embodiments, the notification system 350 may automatically process received information to extract or determine content or contextual information, such as from text of a meeting description or discrete fields in a meeting invitation.

The speech processing module 364 may provide processing and extraction of content or contextual information from audio or related information received from VA devices. Additionally, the speech processing module 364 or a separate speech generating component (not shown) may, when the notification system 350 determines to deliver a notification to a user, generate a speech-based reminder to be audibly presented to a user based on the content and metadata provided by the reminder module 360 or conferencing module 362.

The selective notification module 366, based on the determination of a user's presence from the presence detection module 358, may select one or more VA devices to deliver a given notification. If a user has high likelihood, as indicated by the presence detection module 358, to be in a specific car at the moment, the selective notification module 366 may select a car-integrated VA 110 to deliver the notification. If a user has high likelihood to be at the user's office, the selective notification module 366 may select a workstation with a software VA 112 to deliver the notification. If a user has high likelihood to currently be in a given hotel room, the selective notification module 366 may select a hotel room's VA device 114 to deliver the notification. Additionally, the selective notification module 366 may deliver the notification based on user-device associations from the databases 370 and 372. For example, John and Jane may each carry around mobile devices, but the selective notification module 366 may select only John's mobile device 108 for a notification pertinent only to John, as determined by the content of the notification.

As noted, a defined space, such as a home, may have multiple VA devices 102, 104 and 106. In such cases, a notification may be delivered to one or more VA devices with high chance of successfully presenting the notification to the user. In some embodiments, a presence detection device may not be a VA device. For example, a smart intruder detection system installed at a garage entrance may be able to detect a user's presence and relay the information to the notification system 350, but may not have a speaker or may not be the best notification delivery system for an associated user. In such cases, the selective notification module 366 will determine another VA device suitable and capable of delivering the notification associated with the user instead. Accordingly, while the present disclosure generally refers to the sensing devices as VA devices, the sensing devices may be more broadly considered as any device capable of sensing user activity or interaction. The present disclosure at times refers to sensing devices as VA devices for the purpose of facilitating the illustrations and descriptions only.

Detection of User Activity or Interaction

FIG. 2A is an illustrative table listing collected activity and interaction data from various VA devices using various detection mechanisms ordered according to their detection times. The table also lists scheduled notifications for delivery at given times, which will be further discussed below with respect to FIG. 2B. Various VA devices of the environment 100 collect information that may be communicated to the notification system 350 and subsequently stored in device and user databases 370 and 372. The information collected in the illustrated environment may include timestamp 202, detection device name or ID 204, and the detection mechanism 206 that caused or triggered a user detection or interaction to be recorded by the given device at the time indicated by the associated timestamp. The detection mechanisms include, in the illustrated example, the use of camera input (such as detecting motion), voice recordings via a microphone (including identifying that the detected voice belongs to a specific person), use of login credentials, geopositioning associated with a mobile device, use of an employee badge (which may include RFID or similar features), and use of a key card (which may include a magnetic strip, graphical code, RFID, or other identification features). The notifications 208 are shown in FIG. 2A to illustrate their time-sensitive nature and to facilitate discussion of presence detection at the time of specific notifications in relation to FIG. 2B, as will be described below.

FIGS. 2A and 2B provide examples in an instance where two users (Jane and John) have provided approval for the notification system to collect and analyze location information and interaction information for a number of different VA devices. The notification system 350 and/or individual VA devices may provide each user with options to set user preferences and privacy controls with respect to each of their VA devices. For example, a user may indicate the types of interactions or presence detection data, if any, that the user approves of the notification system 350 receiving from a VA device. The user may further indicate whether the user approves of the notification system estimating a current location of the user, or if the user would prefer to block the notification system from implementing any tracking or presence detection features for the given user and/or for a given VA device.

As noted, there may be more than one user associated with each VA device, and thus the VA devices may collect (or the notification system may store) separate sensing data for each user. For example, the kitchen VA device 272 may collect John and Jane's activity or interaction data separately. The distinction of the detected user may be based on some characteristics of the associated users or based on context. For example, the kitchen VA device 272 may receive a verbal audio signal via a microphone, identify the detected voice as John's voice by comparing John's voice profile to the received audio signal, and then tag the audio signal with John's voice identifier or speaker identifier ("speaker ID").

When a camera of the VA device 272 detects activity or interaction, the VA device 272 may take into consideration various known features of each user, such as the user's height, figure, posture, manner of movements, or combination of these and other visual features to identify and tag the detected activity or interaction with a specific user identifier. One or more of these features associated with the user may be learned over time by the notification system using machine learning models. For example, each time that the specific user responds to a notification at a given VA device, the notification system may provide the visual features of the person captured in video recorded by that VA device around the time that the notification was delivered (before or after) as training data to a machine learning model that is trained to detect the specific user from video data. In other embodiments, certain interactions may not be assigned to a specific user. For example, in some cases, insufficient interaction data may be received to uniquely identify a specific user, such as when the interaction simply involves a person pressing a button on a device or using a camera to capture images of something other than the user. In some instances, a given VA device and/or the notification system 350 may assign user-specific confidence levels for a given presence detection or interaction indicating the system's confidence that the detection or interaction should be associated with the respective user.

Some of the collected data may be stored locally on the individual VA devices, by the notification system 350, on a server, and/or using cloud storage services. In some embodiments, the VA devices and/or the notification system 350 may collect data continuously (e.g., with short time intervals), periodically (e.g., with longer time intervals), or when any activity or interaction triggers detection. In some embodiments, user interactions with a VA device that may trigger another system to perform some action (such as recorded speech that is sent by a VA device to the notification system or another remote system for identification of a command and determination of a potential responsive action) may be sent to the notificaiton system immediately after being captured by the VA device. Other types of detections that are unlikley to be intended as a user command or user request (such as a camera identifying motion in a room) may simply be gathered and recorded on the particular VA device and only sent to the notification system in batches or upon request from the notificaiton system. FIG. 2A is to be considered as an example set of data and not to be considered limiting as to the types of data collected or the format of data storage. Various aspects of FIG. 2A will be disclosed further in relation to FIG. 2B below.

Notification Delivery

FIG. 2B is an illustrative table representing example confidence scores for the scheduled notifications in FIG. 2A, in accordance with some embodiments. FIG. 2A described above provides example detection data that may be used by the notification system 350 to determine the confidence scores in FIG. 2B. Based on the detected activities and interactions in FIG. 2A, example confidence scores for each user for each device are provided for the directed notification delivery at the time of each notification. As will be appreciated, the information illustrated in FIGS. 2A and 2B is shown in a table format for illustrative purposes only, and is not intended to be representative of the specific manner in which the data is stored in a database. A wide variety of database types and data formats may be used. Furthermore, some of the illustrated information, such as the various confidence scores, may only be temporarily stored (such as in RAM) while the notification system 350 is in the process of determining a likely location of a user at a given time, rather than stored in a database.

An example timeline of presence detection and notifications will now be described with reference to FIGS. 2A and 2B. John Doe, an example user, wakes up to an alarm at 6:00 am in bed. A bedside VA device 270 provides the alarm, which John dismisses by speaking "I am up" or "turn off the alarm." The bedside VA device 270 registers the detection mechanism as "voice received" (FIG. 2A) from a microphone. In some embodiments, the audio signal received from John's voice is processed by the bedside VA device 270 to identify the speaker as John (e.g., the device associates the audio signal with a speaker ID representing John), and this determination may be sent to the notification system once determined by the device or at some later point. In other embodiments, the voice recording may be sent over a network to the notification system 350 for voice detection analysis (e.g., parsing the recording to identify a command spoken by John). In either case, the bedside VA device 270 associates the audio signal 140 with metadata about the device's own unique device identification (such as a unique device ID). From this interaction data, the notification system 350 can determine John's presence to be near the bedside VA device 270 at the indicated time that the voice utterance was recorded (6:00 AM ET).

After getting out of bed and readying himself for work, John goes to a kitchen to brew some morning coffee. A kitchen VA device 272 located in his kitchen equipped with a camera detects John's movements nearby. The camera-equipped kitchen VA device 272 identifies the movements to originate from John, and crawls John's day for any tasks from reminders module 360 and/or meetings from conferencing module 362. Upon determination that John has two reminders and two meetings, the speech processing module 364 generates a notification to audibly present to John. In this case, the audible daily briefing notification is "you have two meetings and two tasks for the day" (illustrated as notification 250 in FIGS. 2A-2B). A user may configure notification preferences such that VA devices may provide a notification upon a detection of the user presence. Such types of notifications may not have an exact time associated with the notification delivery, but have a flexible window. Here, the flexible window for the daily briefing may be set as weekday mornings between 6:00 am to 8:30 am.

Once an audible notification is prepared, the selective notification module 366 may compare confidence scores (e.g., likelihood that a particular user is in physical proximity of the given VA device) from various user-associated VA devices to determine a best speaker-equipped VA device to deliver the notification. For example, the bedside VA 270 may have a confidence score for John based on the prior alarm-dismissal interaction at 6:00 am. At the time the daily briefing event 250 is triggered (6:27 am), this confidence score may have degraded to 30% based on passage of time without subsequent detection of John's activity by the bedside VA device 270. On the other hand, the kitchen VA 272 has just detected John's movements and may have a high confidence score of 90%. In some embodiments, the confidence scores across all of the user-associated VA for the user may add up to 100%. In some other embodiments, the confidence scores may be specific to each VA device and not necessarily add up to 100%. In some embodiments, each confidence score may have a floor and ceiling (such as 0%-100%). In some embodiments, the confidence scores may not have a floor or ceiling value, and may be in the form of a raw or normalized value other than a percentage.

For the daily briefing 250, because John left his mobile device 274 charging overnight in his kitchen and has not yet picked up the device, the confidence score for the mobile device 274 may be 0% (given the long period with a lack of user interaction with the device or movement of the device). The determination that John left his mobile device 274 or a virtual assistant device at home may be determined in part based on an indication that an accelerometer or other motion sensor in the device has not detected movement over a given time period. Other VA devices, such as the family car VA device 276, John's office workstation VA device 278, or John's workplace conference room VA device 280 may have no associated confidence scores because the car-integrated VA device 276 is in suspended mode, John has not logged on his office workstation VA device 278 recently, and the conference room VA device 280 found no conference scheduled in next few hours (and may not be sending out beaconing signals, or may be in a sleep mode). The hotel room VA device 282 does not have a confidence score for John yet because John has not yet checked into the hotel room to cause the creation of a user-device association between John and the hotel room VA device. In some embodiments, the selective notification module 366 may remove such devices in suspended mode or without user-device association from a list of candidates to select for the notification delivery. In some embodiments, even if a VA device is in a suspended mode, if the confidence score is above a threshold value, the notification system 350 may wake up the suspended VA device.

The selective notification module 366 compares each confidence score for the various VA devices and determines which VA device(s) may be the best candidate for a successful notification delivery. In some embodiments, it may take into account each VA device's capabilities, such as a VA device not having a speaker, and opt to select a VA device with a lower confidence score but the desired equipment features for a higher chance of successful delivery of the notification to the user via the given device. Once the selective notification module 366 determines which VA device(s) (or, systems as later will be described) will deliver the notification, the notification system 350 sends the audible notification to the selected VA device, in this case, to John through the kitchen VA device 272. In some embodiments, the notification system may send an identifier of the notification to the given VA device (such as an identifier of a notification that was previously stored locally on the given VA device). In other embodiments, the notification system may send text of the notification to the VA device (which the VA device may then audibly present using text-to-speech methods implemented by the VA device), or may send the audio data itself to be played by the VA device.

At 6:45 am, with the freshly brewed cup of coffee in hand, John gets in the family car which has an integrated VA device 276 equipped with a beacon. Generally speaking, beacons may generate defined signals in an attempt to determine whether there are any devices nearby that are capable of detecting that signal. In this example, when John starts the car, the car-integrated VA device 276 wakes up and starts sending a beaconing signal. The beaconing signal is detected and is responded by John's mobile device 274 (or some other device that John may usually carry around, such as a car key or a near-field communication (NFC) enabled keychain). When the car-integrated VA device 276 detects John's presence, it may update the user and device databases 370 and 372. In this example, because there are no notifications associated with the commuting time or the car, the notification system 350 updates the databases but makes no notification delivery.

When John arrives at his office, he logs into his workstation 278, which may be a desktop computer and may be considered to be a VA device because software is operating in the background on the workstation to provide various virtual assistant functionality (including responding to voice commands, presenting reminders, etc.). Because John has provided his credentials to log into the workstation, VA device 278 updates the databases with John's new presence. The VA device 278 may use John's organization-based profile to alter various aspects of notification delivery. For example, when a technician logs into John's workstation with an administrator identification, the VA device 278 may suppress any reminders intended for John.

At 8:30 am, the notification system 350 may determine to deliver John a 30-minute meeting reminder 252. As described, the notification system 350 may crawl a user's reminders to determine details about any notifications and their timestamps. From the meeting invite that John had previously accepted, the notification system 350 extracts the subject matter "Discuss Presentation Slides for Quarterly Performance" from conferencing module 362 and directs speech processing module 364 to generate an audible notification. Based on presence detection module 358 and confidence scores, the selective notification module 366 determines which VA devices should present the meeting reminder. Here, because significant time has elapsed since their last detections of John's presence, the bedside VA device 270, kitchen VA device 272, and Car VA device 276 have their confidence score degraded (set to 10%, 20%, and 2%, respectively).

The degrade rate or decay rate for each VA device may be different based on various factors, such as the type of VA device or the associated presence detection mechanism. For example, here, the bedside VA 270 has detected John's presence before the car VA device 276, but the bedside VA's confidence score has not degraded as fast as the car VA device's confidence score has. In this example, both John's mobile device 274 and office VA 278 have high confidence scores 80% and 95%, respectively. John may have interacted with the mobile device, which may have verified John's identity with a password unlock, and John may also have been hard at work on his workstation.

Where there are multiple VA devices with high chances of successful notification delivery, the selective notification module 366 may select more than one VA to deliver the notification. For example, here, the notification system 350 may deliver the meeting reminder to both John's mobile device 278 and office VA 278. In some embodiments, the selective notification module 366 may select any VA device having a confidence score above a certain threshold value. In some embodiments, a VA with the highest confidence score may be selected. However, it should be noted that various considerations, such as timestamp, detection type, location and others may go into the calculation of the confidence score and the specific devices selected for notification delivery. For example, if two VA devices are located in the same room, the notification system 350 may select only one of those devices for notification delivery even if both devices have high confidence scores.

At some point before 9:00 am, the notification system 350 may perform a check on the presentation slide discussion meeting by pulling the meeting invite from the conferencing module 362 (or some other calendar provider) to determine that the meeting is not rescheduled or cancelled. When it determines that the meeting is still valid, the notification system 350 proceeds to generate a request for John to join the meeting 254. Here, the office workstation VA device 278 may recognize that just before the meeting invitation, John was working on his workstation. With a high confidence score obtained (such as 100% as shown for John's office VA device 278), the notification system 350 delivers the notification to the workstation VA. John's response to the meeting invitation (e.g., via a spoken utterance or command) is received by the speech processing module 364. If the response is in the affirmative, the office workstation VA 278 may obtain data and/or metadata associated with the meeting from the conferencing module 362 (such as a meeting ID, John's personal identification number (PIN), and a conference call number), automatically dial into a conference call, and provide John's credentials. The VA device 278 may include a microphone and a speaker so that John may use the VA device 278 to effectively communicate with other participants in the meeting. Advantageously, the VA device 278 working in conjunction with the notification system 350 can reduce the steps in joining a meeting, and the need for peripheral equipment such as a conference phone.

In the meeting, John finalizes the presentation slides for the upcoming 11:00 am presentation to a CEO. At 11:00 am, John goes to a conference room. The conference room may have a VA device 280 equipped with beaconing capability. When John comes into proximity of the VA device 280, its beacon and John's employee identification badge may become communicatively coupled. The VA device 280 then registers John's presence in the conference room, and identifies John as a meeting participant from a meeting schedule database. Accordingly, a temporary user-device association between John and the conference room VA device 280 may be established. Here, based on the certainty of the employee identification badge in physical proximity and the suggested intention of the participant to attend a meeting set at a definite time, the VA device can be certain (confidence score 100%) that John is present in proximity to the device. The VA device may audibly inform John that the meeting was cancelled five minutes ago (meeting cancellation 256) and may then remove the temporary user-device association.

At around 2:28 pm, John arrives at Boston's Logan International Airport to catch a flight to Los Angeles for a promotional event the next day. John's mobile phone 108 has a GPS sensor for geopositioning, which indicates that he is at a specific location near an airport. In some embodiments, the notification system 350 may take John's likelihood of being on a flight and resulting inactivity into consideration and inform John ahead of a scheduled reminder or may delay delivery until he has landed and establishes new presence elsewhere.

In this example, John remembers that someone needs to pick up laundry just before he gets on the flight. John may set a new reminder 258 (identified as "pick up laundry") intended for delivery to Jane. In some embodiments, John may specify the reminder to be delivered when Jane's presence is detected by a particular VA device. For instance, John may specify "remind Jane to pick up laundry when she gets in her car." In some embodiments, the reminder may be set to be delivered at a certain time, such as "remind Jane to pick up laundry at 5:30 pm."

Here, at 5:10 pm (not shown) Jane may get in a car equipped with a VA device 276. The VA device 276 detects that Jane is nearby from communicative coupling between Jane's mobile device and a beacon of the car VA device 276. Both the car VA device 276 and Jane's mobile device 284 may have high confidence scores (80% and 90%, respectively) because of mutual detection. In some embodiments, the selective notification module 366 may determine that Jane is driving based on geopositioning and select to deliver the notification only to the car VA 276 to reduce distraction while driving despite the fact that the mobile device 284 has higher confidence score. In some embodiments, the notification system 350 may analyze and recognize the reminder as an errand type, and deliver the notification to Jane before the set 5:30 pm pickup time. For example, the notification delivery may occur as Jane gets in the car, or as Jane starts driving toward home.

In this example, Jane has later picked up laundry and returned home. Around 6:00 pm, Jane is in her living room where there are no nearby VA devices other than her phone. As Jane watches a TV show, she has left her mobile device 284 mostly untouched. However, the notification system 350 determines that it is garbage day and that Jane needs to empty trash for tomorrow's pick up. When the notification system 350 finds very low confidence scores for all the VA devices associated with Jane (0%, 5%, 5%), the notification system 350 may broadcast "empty trash" reminder 260 to all the VA devices currently in the home. In this example, the bedside VA device 270, kitchen VA device 272, and Jane's mobile device 284 will all deliver the reminder.

At 10:39 pm, John arrives at Los Angeles airport. Similar to how his presence was updated at Boston airport, John's presence is updated via the presence detection module 358. Then at 11:05 pm, John checks into his hotel room. In some instances, hotels may provide a VA device 282 for its guests. When John checks into his room with a card key (or some other security mechanism), the VA device 282 may recognize John as the guest for the night and temporarily create a user-device association. The VA device 282 may download John's reminders and meeting schedules. The VA device intelligently recognizes that there is a three hour time zone difference between where John is from, Boston, and where he is currently staying, Los Angeles, and accordingly adjusts all reminders and meeting schedules.

At 12:00 am eastern time, or at 9:00 pm pacific time, John turns off the light since he is jetlagged. In some embodiments, the hotel room VA device 282 may have a light sensor that detects environmental darkening, which may in turn trigger a notification 262 to John, "tomorrow's meeting on 'New Widget Promotion' is scheduled at 10:00 am pacific time at LA Convention Center."

System Overview

Figure 3:
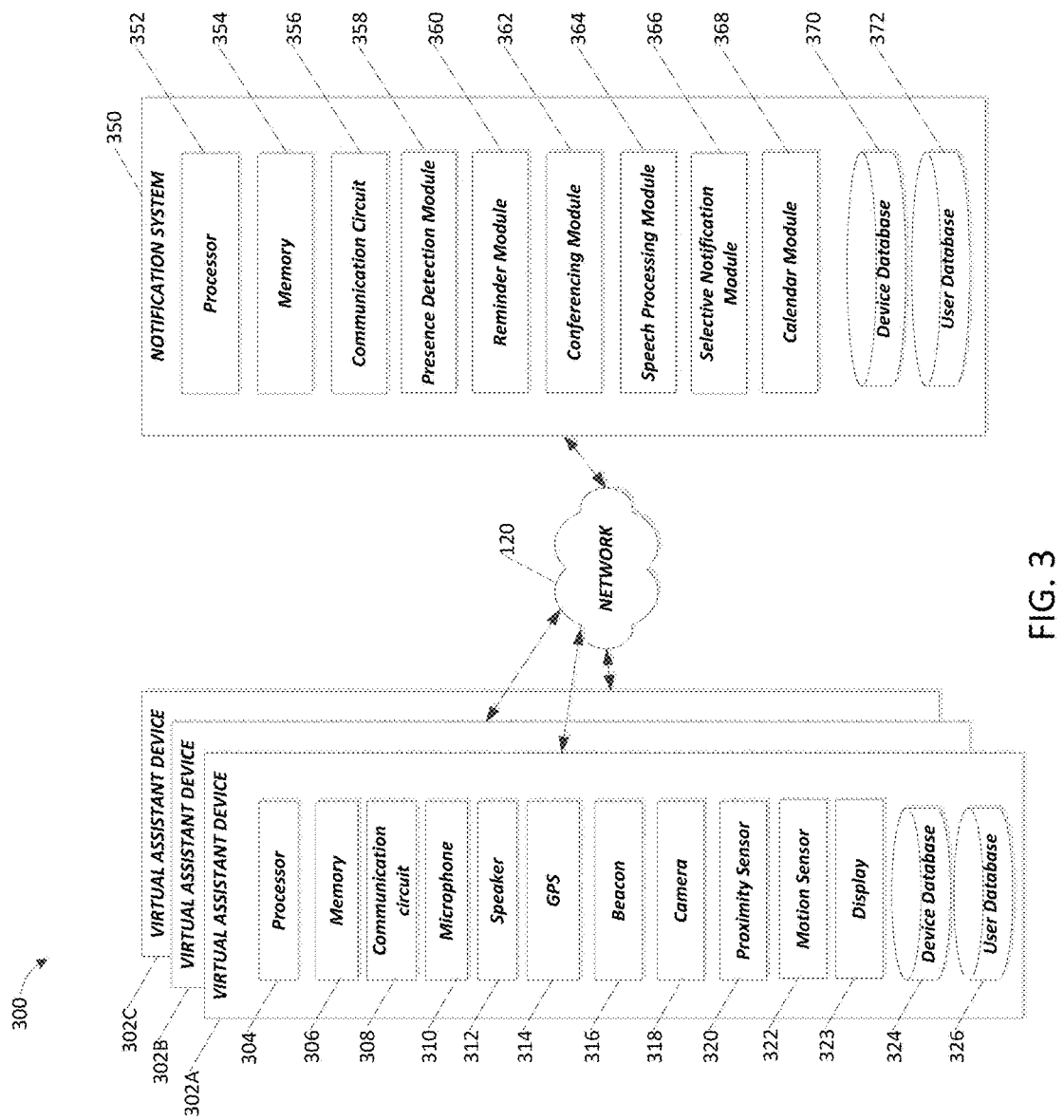
FIG. 3 is an illustrative diagram showing various components of the virtual assistant devices and the notification system according to some embodiments.

FIG. 3 is an illustrative diagram showing various components of the VA devices 302A, 302B and 302C, and the notification system 350. As depicted in FIG. 3, the networked environment 100 may include one or more VA devices and a notification system 350. In various embodiments, the VA devices may be heterogeneous or homogeneous in terms of their device type and/or vendor. The VA devices may include various types of electronic devices, digital devices, and/or computing devices. The VA devices may include voice-capturing devices or smart speakers as well as other home automation and/or IoT devices. The general architecture of the VA devices and the notification system may include an arrangement of computer hardware and software modules used to implement aspects of the present disclosure. Both types of systems may include many more (or fewer) elements than those shown in FIG. 3. In some embodiments, both types of systems in communication via the network 120 may be an example of what may be referred to as a networked environment for directed notifications.

The notification system 350 includes a processor 352, a memory 354 (e.g., a computer-readable medium), a communication circuit 356, a presence detection module 358, a reminder module 360, a conferencing module 362, a speech processing module 364, a selective notification module 366, a calendar module 368, a device database 370, and a user database 372, all of which may communicate with one another. The processor 352 may communicate to and from the memory 354 to execute one or more of the modules.

The memory 354 may contain computer program instructions (grouped as modules in some embodiments) that the processor 352 may execute in order to implement one or more embodiments described herein. The memory 354 may generally include RAM, ROM and/or other persistent, auxiliary or non-transitory computer-readable media. The memory 354 may store an operating system (not shown) that provides computer program instructions for use by the processor 352 in the general administration and operation of the notification system 350. The memory 354 may further include computer program instructions and other information for implementing aspects of the present disclosure.

As an example, in one embodiment, the memory 354 may include a speech processing module 364 to analyze received audio signals 140 to extract content and context of user speech utterances 107. In some embodiments, some or all of the modules may have their dedicated hardware (including their own memory) and interface with the notification system 350 over a network 120 rather than residing in the notification system 350. For instance, the speech processing module 368 may be located on another server or as part of another system, and may extract information and transmit the information for use by the reminder module 364 and/or conferencing module 366. In some embodiments, other modules may be implemented as services. Services in the environment 300 may be implemented according to a service-oriented architecture (SOA) in which services exchange requests and responses to perform complex operations. For example, the speech processing module 364 may be implemented as a service that analyzes and acts upon voice input from the VA devices and returns content and metadata for the analyzed voice input.

In some embodiments, the notification system 350 may include a communication circuit 356 for connecting to the network 120. The communication circuit 356 may provide connectivity to one or more networks or computing systems, and the processor 352 may receive information and instructions from other computing systems or services via one or more networks. In the example illustrated in FIG. 3, the communication circuit 352 may be in communication with VA devices 302A, 302B and 302C via the network 120, such as the Internet.

In some embodiments, the presence detection module 360 may provide confidence scores based on detected user activity or interactions from the VA devices 302A, 302B and/or 302C that the given devices detected using various sensing mechanisms. The calculation of the confidence scores will be further described with respect to FIG. 5 below. The reminder module 360 provides time-information and content of the various reminders. The reminders shown in FIG. 2A are a few example reminders. The content of a reminder may be explicit or inferred. For example, inferred content may be associated with a wake-up alarm scheduled for a certain time. Such an alarm may have an inferred content of "wake up now" that can be inferred by a system for all morning alarms. Some explicit content reminders may be those established by a user, such as "pick up kids after school" or "empty trash," or may be determined from a meeting invitation, such as "meeting to review quarterly performance starts in thirty minutes." One manner in which a user may establish a reminder is by speaking a command such as "remind me to take out the trash tomorrow after work." A user may similarly move the time of a reminder or set a reminder to repeat at a later time by speaking a command such as "remind me again in five minutes."

Reminders may have associated trigger times representing when a given reminder should be the subject of a notification to a user. In some embodiments, a user may configure preferences for receiving notifications regarding the reminders (such as 30 minutes before the reminder time, 15 minutes before the reminder time, or at the reminder time) to modify the reminder-associated trigger times. The processor 352 obtains current time information from the notification system 350 (for example, from an internal clock or a network clock) and makes comparisons of the current time and a reminder's trigger time. When the processor 352 determines equality between the two or that a trigger-time is lapsed without triggering any actions in relation to the reminder, the processor 352 executes reminder-handling routines. In other embodiments, a reminder service external to the notification system 350 may alert the notification system when a reminder has been triggered, such as by utilizing a listening protocol or otherwise enabling the notification system to subscribe to events associated with a given user.

In some embodiments, the reminder module 360 works in concert with the presence detection module 358 to adjust a reminder's trigger time. While the notification system 350 may use a universal time, a user may travel to different time zones. A reminder set for a certain time in a time zone may not have the same trigger-time in another time zone. One would appreciate that some reminders are referenced based on the originating location's time while other reminders are referenced based on a user's present time zone as determined by the presence detection module 358. For example, a wake-up alarm set at 6:00 am should follow the user's new current local time as the user travels across time zones. On the other hand, a reminder to call a business partner who resides in a particular time zone should not follow the user's current local time, but be based on the universal time.

The conferencing module 362 provides time information and content of meetings, which may be determined based on a variety of electronic calendars or meeting invitations associated with various third-party calendaring services or applications. A meeting may have information associated with the meeting such as, time, location, participants (often identified with respect to each participant's unique identifier, such as an e-mail or an employee identification number), and conference call specific information such as phone number, meeting ID, or passcode. In some embodiments, the calendar module 368 may work in concert with the reminder module 364 to share information about the time and subject matter of the meeting. Also, similar to the time zone adjustments described in relation to the reminders, the meeting time notification can be adjusted based on the user's current time zone.

The speech processing module 364 can process audio signals from a VA device to extract content from the audio signals and/or obtain reminder or meeting information from the reminder module 360 or the conferencing module 362. In some embodiments, the speech processing module 364 may also generate audio signals to deliver to the VA devices 302A, 302B and/or 302C as part of a notification delivery. In some embodiments, the speech processing module 364 may use various algorithms to identify the originating source of an audio signal, which may be a particular user. For example, the speech processing module 364 may use pattern recognition, machine learning models, and/or various voice profiling techniques to identify John's voice as originating from John and tag the audio signal with John's speaker ID, while tagging Jane's voice with Jane's speaker ID. In some embodiments, the speech processing module 364 may work in concert with the presence detection module 358 to provide information that a particular user is in physical proximity of particular VA device. It should be noted that the presence detection module 358 may also detect user presence from non-speech audio signals, such as groans or scraping of a carpet (or, non-audio signals such as movements in front of a camera or using a beaconing signal).

The selective notification module 366 determines which VA devices should deliver a notification to a user (e.g., which VA devices the notification system should instruct to deliver a given notification). In some embodiments, it may work in concert with the presence detection module 358 to determine which of the VA devices have high likelihood, based on the confidence scores, that the user is in physical proximity of the given device. In some embodiments, when confidence scores are all below certain thresholds (indicating that each of the VA devices have low likelihood of the user in physical proximity), the selective notification 366 may select more or all of the VA devices to deliver the notification. In some embodiments, the selective notification module 366 may work in concert with the reminder module 360 or the calendar module 368 to determine to which of the VA devices to deliver the notification. For example, the selective notification module 366 may determine to broadcast a reminder marked with high importance, such a child's birthday, to all the VA devices associated with the user.

In some embodiments, the calendar module 368 may also provide relevant information for the notification system 350. For example, if a user is marked as on a vacation and out of the office, the notification system 350 may decide to not deliver a notification for work-related matters. The notification system 350 may further include device database 370 and user database 372 that store user-device associations, user-specific preferences and reminders, meetings, etc., as well as device-specific component lists and features. It should be noted that the above descriptions and distinctions of the modules are provided only to facilitate the understanding of this disclosure and should not be interpreted or understood to limit this disclosure to any specific implementation.

The VA devices 302A, 302B and 302C may each include a processor 304, a memory 306 (e.g., a computer-readable medium), a communication circuit 308, one or more of various sensing mechanisms (such as a microphone 310, speaker 312, GPS 314, beacon 316, camera 318, proximity sensor 320, motion sensor 322, and/or other sensing mechanisms), a speaker 312, a device database 324, and a user database 326. In the illustrated embodiment, the VA device 302A includes a display 323, such as a touchscreen display. Other VA devices may not include a display screen and may provide feedback to the user audibly, via haptic feedback (via one or more haptic feedback mechanisms not illustrated in FIG. 3), and/or as visual feedback via hardware other than a display screen (such as indicator lights, not illustrated in FIG. 3), The processor 304 may execute various device drivers to operate its one or more sensors 310, 314, 316, 318, 320 and/or 322. In some embodiments, the processor may provide a suspended mode or sleep mode, such that a detection of a user's presence may wake the VA device 302 up from the suspended mode or sleep mode. In some embodiments, the processor 304 may provide some signal processing (such as filtering the received signals to remove anomalies) or provide data processing (such as compression of audio signals to reduce burden on the communication circuit 308 or minimize network usage).

The memory 306 may contain computer program instructions (grouped as modules or modules in some embodiments) that the processor 352 may execute in order to implement one or more embodiments described herein. More specifically, the memory 306 may store an operating system and device drivers for the operation of the sensors. The memory 306 may further include computer program instructions and other information for implementing aspects of the present disclosure. While FIG. 3 shows various possible detection or sensing mechanisms, the specific features provided by a given VA device and its hardware components may vary from device to device.

In some embodiments, the VA device 302A may include a communication circuit 308 for connecting to the network 120. The communication circuit 308 may provide connectivity to one or more networks or computing systems, and the processor 304 may receive information and instructions from other computing systems or services via one or more networks. In the example illustrated in FIG. 3, the communication circuit 308 of VA device 302A may be in communication with other VA devices 302B and 302C and/or the notification system 350 via the network 120, such as the Internet.

The microphone 310 detects audio signals, which may be verbal or non-verbal. Verbal audio signals may contain content that can be analyzed and extracted by the speech processing module 364 for their content and/or to determine a human speaker's identity. In some embodiments, a speech processing module similar to module 364 may be included in the VA device 302A for local processing of recorded audio data (not illustrated). Non-verbal audio signals, such as a garage door opening, may also indicate a user's presence.

These audio signals 140 detected by the microphone 310 can provide a basis for confidence score calculation for the detecting VA device.

The GPS 314 may be used to determine geographic coordinates of a portable VA device 302A, such as a mobile device. The geopositioning information provided in the form of GPS coordinates of a portable VA device can inform the notification system 350 of a user's whereabouts. The beacon 316, generally, senses other devices capable of detecting beaconing signals, as discussed above. This type of sensing mechanism may advantageously be used for user presence detection even when a user is not in the VA device's field-of-view (FOV). Beaconing may broadly be interpreted to include various devices that can respond with recognizable signals, such as via a near-field-communication (NFC) tag or reader circuits. For example, a notification system 350 may determine that a user is at work when the user scans his employee identification card via an office building scanner.

The camera 318 and/or motion sensor 322 may detect movements that can be used in determining a confidence score that a user is in physical proximity of the given VA device 302A. In some embodiments, the processor 304 may use various algorithms applied to the captured images to identify a person (if the images indeed contain a person) in the images. The algorithms may take into consideration various known features of each user associated with the device, such as the user's height, figure, posture, manner of movements, facial features or a combination of these. The VA devices may further employ other sensor types, such as a proximity sensor 320, to detect a user's presence. The motion sensor 322 may detect motion near the virtual assistant device (such as based on infrared or other input regarding the external environment) or motion of the virtual assistant device itself (such as using an accelerometer, not shown in FIG. 3, in an instance where the given virtual assistant device is a wearable device).

In some embodiments, one or more of the sensors and their detections may be combined to provide higher confidence in the detected content. For example, a series of captured images from the camera 318 may be combined (or cross-analyzed) with voice detection from the microphone 310 to determine that the a face in the captured images is the face of the speaker. On the other hand, if there is a mismatch, such as is a situation when Jane is captured by the camera 318 but John's voice comes out of Jane's speaker phone, then a lower confidence score may result after the combined analysis.

The speaker 312 may be used to play audio data received from the notification system 350 to the user, or to play locally-generated audio data (such as using text-to-speech functionality). The VA device 302A, 302B and 302C may each include a device database 324 and user database 326 that include user-device associations, user-specific preferences and reminders, meetings, etc., and device-specific component lists and features. As previously noted, a sensing device or other device that receives input that is used by the notification system to determine confidence scores regarding user presence does not have to be a VA device. For example, sensing devices other than a VA device may upload sensing data to a VA device or to the notification system 350 to be considered in presence determinations.

Illustrative Notification and Presence Detection Methods

Figure 4:
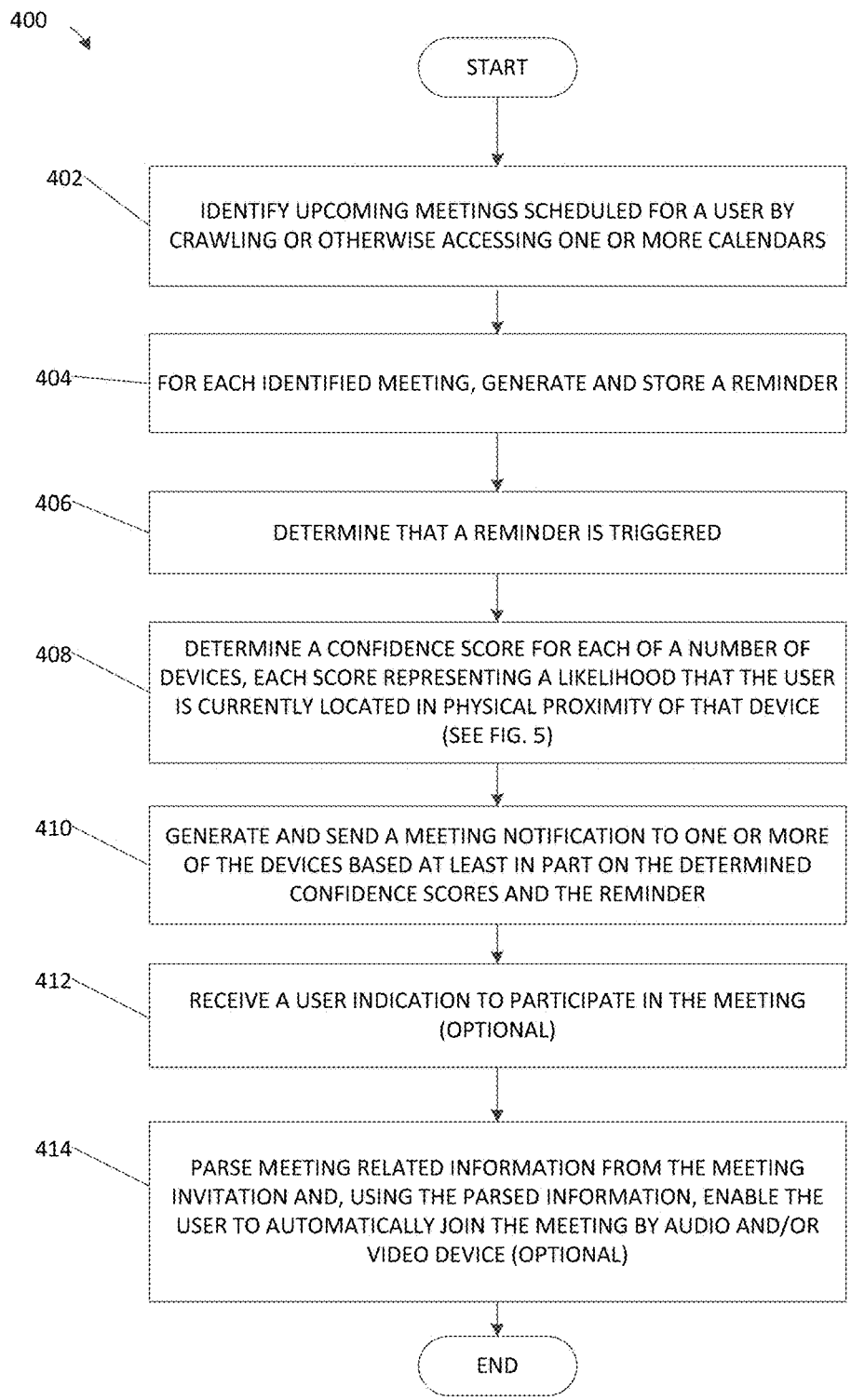
FIG. 4 is an illustrative flow diagram of the notification system generating a meeting reminder, selecting one or more virtual assistant devices for delivery of an associated notification, and delivering the notification to the one or more virtual assistant devices, according to some embodiments.

FIG. 4 is a flow diagram depicting an illustrative method 400 implemented by the notification system 350 for notifying a user of an upcoming reminder via a given device based on the user's likely presence in the proximity of the specific device. The delivered notification may be, for example, a reminder regarding an upcoming meeting, in one embodiment. While the method will be described with respect to meeting reminders, it will be appreciated that reminders of other types may trigger notifications that are delivered in a similar manner, as discussed above.

At block 402, the notification system 350 crawls one or more of a user's calendars to identify any upcoming meeting invitations or scheduled meetings. In some embodiments, the crawling may be performed periodically at a pre-set interval, such as once per day or once per hour. In some embodiments, the crawling may be performed whenever the notification system 350 detects any updates to the user's calendar. Each of a number of VA devices may share one or more calendars and provide updates to the user's calendars as it receives any calendar updates from external systems or from the user. In some embodiments, the notification system may utilize an application programming interface (API) offered by one or more third-party calendaring services or email services in order to search calendars that the user accesses through various services or applications.

At block 404, the notification system 350 generates a reminder for each of the identified meetings. In some embodiments, the reminder may include the subject of the meeting from a calendar entry or meeting invitation. For example, a meeting entry or invitation may have a subject line description and time designated in discrete fields, and the reminder may be set for a predetermined amount of time prior to the scheduled meeting time. In some embodiments, the notification system may effectively create a "master" calendar for the user that includes reminders for meetings or other calendar entries that originated from a number of different calendars maintained by different third-party services on behalf of the user (such as a calendar associated with an email client program used by the user's employer, a personal calendar maintained by an operating system of the user's personal mobile device, etc.). Advantageously, the master calendar can provide the notification system 350 with a uniform source of reminder retrieval.

At block 406, the notification system 350 may obtain the current time (such as from a system clock), and make a comparison between the current time and a reminder time to determine whether the reminder should be triggered. In some embodiments, the reminder times are registered in the master calendar as a universal time, such as Coordinated Universal Time (UTC), POSIX time, or any other universal time standard. When using UTC time, reminders may have associated UTC offsets based on their geographical location. Additionally, the reminders may further have associated UTC offset according to local calendar rules, such as Daylight Saving Time, as determined by referring to calendar module 368 for the trigger date and time of the reminder. For example, a meeting reminder in Seattle is registered along with a UTC-07:00 offset (or a UTC-08:00 offset if the calendar module 368 determines that Daylight Saving Time is still in effect). Similarly, the current time may have the same universal time format as the reminder time. Advantageously, the shared time format between the current time and the reminder time allows for easy comparison between the two times. As discussed above, in other embodiments, a reminder service external to the notification system 350 may alert the notification system when a reminder has been triggered, such as by utilizing a listening protocol or otherwise enabling the notification system to subscribe to events associated with a given user's calendar.

After a reminder is triggered, in some embodiments, the notification system 350 may then check whether the triggered reminder is still a valid reminder. A reminder may not be a valid reminder because, since initially crawling and generating a reminder, there may have been a cancellation or a reschedule of the reminder (such as a cancellation of an underlying meeting associated with the reminder). In the case of a cancellation, the notification system 350 may remove or ignore the reminder. In the case of a rescheduling, the notification system 350 may update the reminder in its master calendar with a new reminder time. In either of these cases, the system does not proceed to block 408.

At block 408, the notification system 350 determines a confidence score for each of a number of VA devices associated with the user, where each confidence score represents a likelihood that the user is located within physical proximity of the given VA device. As described above, each user may be associated with one or more devices, such as the example user John's association with the bedside VA device 270, kitchen VA device 272, mobile device 274, car VA device 276, workstation VA device 278, hotel room VA device, etc.

In some instances, a VA device may have high likelihood of an associated user being nearby, but may not provide sufficient information to the notification system to determine an accurate confidence score. Some examples are when the given device is in a suspended mode, the user-device association is no longer valid (e.g., a temporary user-device association for a hotel room VA has been removed), or when a VA device has operating constraints (such as may occur with an office workstation VA over a weekend). A more detailed description of the confidence score determinations is provided in relation to FIG. 5 below.

At block 410, the notification system 350 generates and sends a meeting notification to one or more of the VA devices based on the determined confidence scores. In some embodiments, a user-associated VA device with the highest confidence score may be selected for the notification delivery. In other embodiments, multiple VA devices may be selected, such as when a notification has high importance, when none of the confidence scores are above a threshold value, and/or when multiple VA devices have similarly high confidence scores.

In some embodiments, the confidence scores are compared against a threshold confidence score to determine one or more VA devices to deliver the notification. For example, where a threshold confidence score is 80% and both mobile phone 108 and car VA device 110 have confidence score of 90%, then the notification system 350 may send a notification to both VA devices. In some embodiments, where there are no VA device with a confidence score satisfying the threshold value, then the notification system 350 may broadcast the notification to all VA devices associated with the given user.

In some embodiments, the notification information may be audio signals for audible presentation. The audio signals may be verbal, such as human-understandable speech, or non-verbal, such as music or a chime. The notification system may send the notification as audio data to the VA device for playback, or may send text data or a notification identifier that the VA device interprets to generate associated automated speech. In some embodiments, the audio signals may solicit user interaction, such as a request for the user to participate in a meeting. In some embodiments, upon a reception of the meeting invitation notification at block 412, the user may accept or deny participation in the meeting. The user response may be a user speech utterance, such as speaking the command "join the meeting." In some instances, a user may indicate to reschedule or cancel the meeting. In other instances, a user may trigger a "snooze" option and instruct the notification system 350 to set up a send the same notification again at a later time.

In some embodiments, upon the user's acceptance to the meeting invitation to participate at block 414, one of the notification delivery VA devices parses information associated with the meeting, such as a meeting ID, conference call number, and/or passcode to the meeting, and using the parsed information, automatically joins the user to the meeting by phone, videoconference, and/or other connection. In some embodiments, the VA device may provide its microphone and/or speakers for the user to participate in the meeting.

Figure 5:
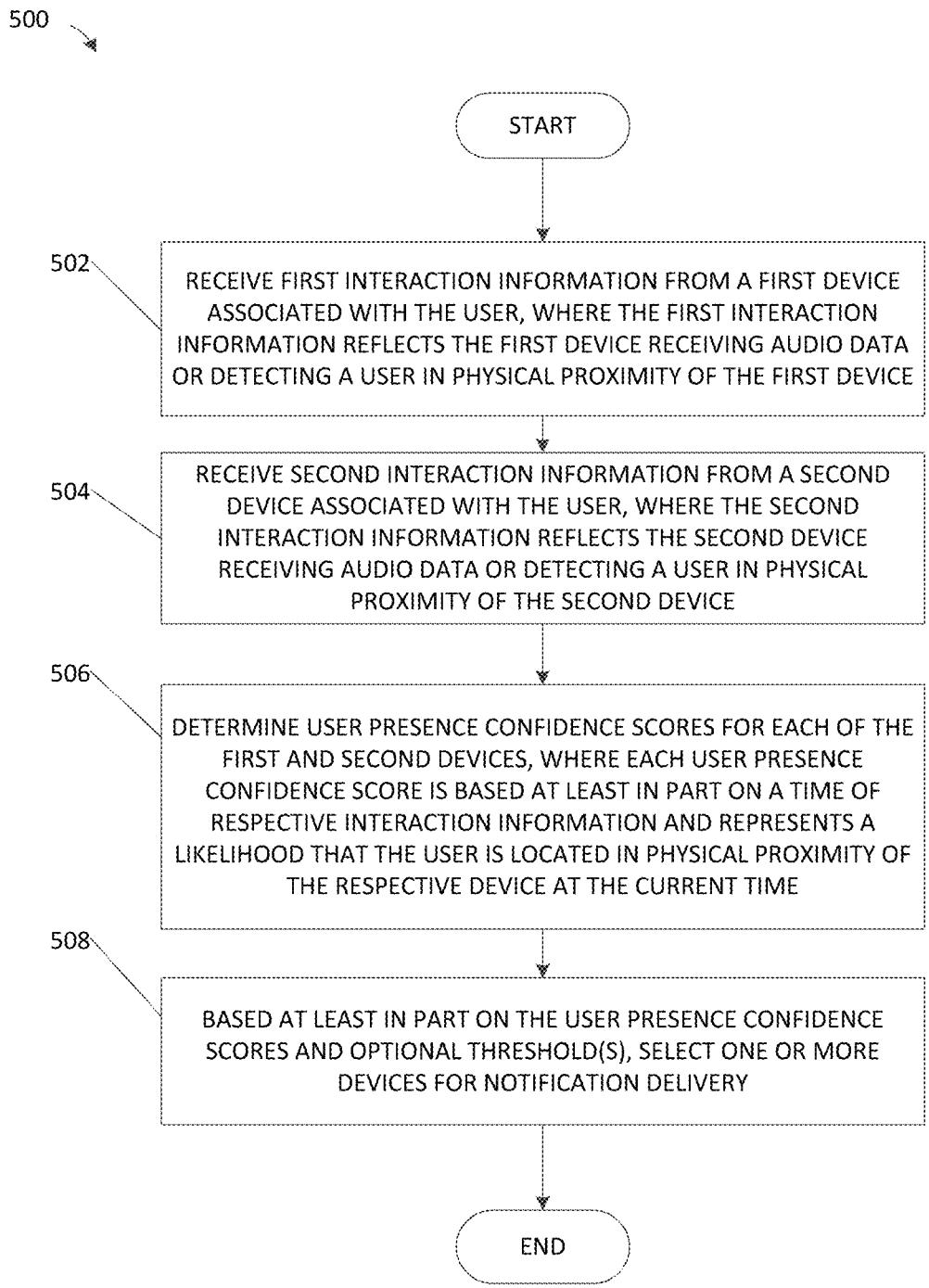
FIG. 5 is an illustrative flow diagram depicting a method of using interaction data collected by various virtual assistant devices to determine which of the virtual assistant devices have a sufficient likelihood that a given user is in physical proximity of the virtual assistant device at a current time, according to some embodiments.

FIG. 5 is a flow diagram depicting an illustrative method 500 for determining confidence scores and selecting a device for notification delivery. At block 502, a device equipped with some sensing mechanism (described in relation to FIG. 3) detects a first activity or interaction from a user. The first detected event has an associated timestamp providing the detecting system with information about the whereabouts of the user. In other words, the first detected event indicates that the user is in physical proximity of the detecting device. In some embodiments, the detected event may be the user's voice captured by a microphone. In other instances, the detected event may be the user's movements captured by a camera. In others, a user's activity or interaction may be inferred, such as when the user's mobile device returns a beaconing signal sent by a VA device. Because a mobile device is likely to be found near a user at most times and is strongly correlated with the identity of the user, detecting the mobile device nearby can imply that the user is nearby. At block 504, another device equipped with some sensing mechanism (described in relation to FIG. 3) detects a second activity or interaction from a user. The second detected event has an associated timestamp providing the detecting system with information about the whereabouts of the user.

At block 506, the notification system 350 determines user presence confidence scores for each of the first and second sensing devices (and potentially other devices) based on each device's sensor-captured activities and interactions, where the user presence confidence score for a device reflects a likelihood that the user is in physical proximity of the corresponding device. In some embodiments, the confidence scores are based at least in part on the timestamps of the detected interactions with each of the sensing devices. For example, if the first device detected a user interaction before the second device detected another user interaction, there is a higher likelihood that the user is in physical proximity of the second device at the current time. Therefore, the second device may have a higher confidence score than the first device.

Higher or lower confidence score may be attributed to the sensor captured activities and interactions based on the type, content, sensor configuration, and/or other factors. In some embodiments, a type of sensor that captured an interaction, such as a voice captured by a microphone as opposed to movements captured by a camera, may result in a different weight being applied in determining a confidence score for a given sensing device. For example, a speaker ID identified from a clear verbal communication has a strong correlation with the identity of the detected user and may provide a high confidence score. On the other hand, detected movements (height, figure, posture, or similar determinations) are not as strongly correlated with the user and may lead to a lower confidence score. In some instances, these weights may be applied to the interaction information, which is then further adjusted by a time-based decay value (discussed above) before determining a final confidence score.

In some embodiments, different captured data (potentially from multiple nearby devices) may be combined in determining a confidence score for a given device. As described, generally, captured movements or figures do not provide as high of a confidence score as the speaker ID from a captured voice sample. However, if a camera captured the face of the user clearly, then the camera-sensing VA may merit a higher confidence score than the one with speaker ID because faces, often, correlate even stronger with the user than user's voice. Additionally, in some embodiments, each device's sensor configuration may also affect its confidence score. For example, a sensing device may have both a camera and a microphone for its use. The captured images and voice sample from both sensors may be combined to positively or negatively reinforce confidence level for the device. For example, a series of captured images from camera with a certain time stamp may be combined with voice detection from a microphone with a similar time stamp to positively affect the device's confidence score. When the time stamps are far apart, then the combined data may negatively affect the device's confidence score.

In some embodiments, the sensed data may, in addition to the combination, be cross-analyzed. For example, the voice detection from the microphone and the captured images of the speaker's face may be cross-analyzed to determine whether the mouth movements can be attributed to the speech, or vice versa. A high correlation may positively reinforce the confidence score for the sensing device. The voice detection (identifying speaker ID), face detection, cross-analysis, and other determinations may be performed by various algorithms at the sensing device, at the notification system 350, or via some other cloud-based service.

Two or more sensing devices may affect confidence scores of each other. For example, where two sensing devices are located apart from each other and sending out beaconing signals for a user's mobile device, a detection of the mobile device's response may give very high confidence score because the mobile device strongly implies the user's presence nearby. However, because only one mobile device exists and detection of the device strongly implies the user's presence nearby, it also strongly implies user's non-presence elsewhere. Therefore, even if a first device received a beacon response just a few minutes ago, if a second device receives a beacon response more recently, the notification system 350 can reduce the first device's confidence score (in addition to the normal time decay). In some embodiments, the sensing devices may be in a presence-detection network and inform other sensing devices of detection events, so that the other devices may update their confidence scores.

Accordingly, types of detection, content detected, and device sensing configurations may affect confidence score in addition to the detect activity or interaction timestamps. As described, each device's confidence score generally degrades over time. However, the time decay rate may be a function that takes in various other inputs, such as the type of detection, content detected, and/or device sensing configurations. For example, a confidence score based on only movement detection may degrade faster than a confidence score based on detection of a user's face. Also, a confidence score based on (and cross-analyzed on) voice and movement may degrade more slowly than a confidence score based on voice only.

Additionally, in some embodiments, confidence scores may depend on the quality of the data collected as determined by each sensing device. In other words, for example, for two different voice sets detected by a same sensing device equipped with a microphone, the sensing device may determine one voice set to have superior quality based on the input or after its analysis. With one voice set, it may determine a speaker ID with greater certainty, thereby indicating that the speaker ID should be associated with a higher confidence score. With the other voice set, it may barely be able to recognize a speaker ID, thereby indicating that the speaker ID should be associated with lower confidence score. Similarly, captured video quality may be associated with higher or lower confidence score. Accordingly, some notification systems 350 may also take captured data quality into consideration for the confidence scores.

Various computer algorithms may be used to calculate the confidence scores. The algorithms may involve linear algebra (e.g., weighted functions), graph theory, logarithmic (e.g., for time decay), etc. In some embodiments, the notification system 350 may use one or more machine learning techniques to improve the confidence score determinations, such as by learning behaviors of a specific user. For example, each time that a user joins a meeting or otherwise responds affirmatively to a notification presented at a specific VA device, the notification system 350 may interpret that feedback as an indication that the user was in fact present at the given VA device. The user presence information that was collected previously (such as the detection information that the notification system 350 based a confidence score on that caused the notification to be presented at the given VA device) may then be provided in a training process to a machine learning model as being correlated with user presence for the given user. Based on this feedback being provided to a machine learning model, the confidence score weights associated with various types of detection data and/or device types or locations for the given user may be altered over time to improve the notification system's confidence score accuracy. Conversely, if a notification was provided to a VA device that did not receive a user response, weights that led to the given VA device receiving a high confidence score may be lowered as a result of a machine learning process.

At block 508, the notification system 350 selects one or more devices for notification delivery based on the confidence scores, as has been discussed above. In some embodiments, more than one device may be selected to increase the likelihood of successful notification delivery. For example, the notification system 350 may have a confidence score threshold which it may compare with confidence scores of each delivery device and select all devices with higher confidence score. If multiple devices are located very close to each other (e.g., in the same room), only one of these devices may be selected.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a device profile database that stores device profiles for computing devices associated with a user, wherein the computing devices associated with the user include a first device and a second device that are each configured to obtain voice input; and
at least one hardware processor in communication with the device profile database and configured to execute computer-executable instructions to at least:
obtain a first indication of user presence associated with the first device, wherein the first indication of user presence identifies a first time that the user was detected in proximity of the first device;
obtain a second indication of user presence associated with the second device, wherein the second indication of user presence identifies a second time that the user was detected in proximity of the second device, wherein the second time is later than the first time;
identify a notification to be audibly presented to the user;

determine that the user is more likely to be currently located in physical proximity of the second device than the first device based on a comparison of the first time and the second time; and cause the second device to audibly present the notification.

2. The system of claim 1, wherein determining that the user is more likely to be currently located in physical proximity of the second device than the first device is based further on a first confidence level associated with the first indication and a second confidence level associated with the second indication.

3. The system of claim 2, wherein the at least one hardware processor is further configured to apply a decay value in association with the first interaction when determining the first confidence level, wherein the decay value is applied based on an elapsed time since detection of the first interaction by the first device.

4. The system of claim 1, wherein the user is considered to be located in proximity to the first device when the user is near enough to the first device to hear audible output from the first device.

5. The system of claim 1, wherein the notification relates to a meeting appearing on an electronic calendar associated with the user, and wherein the at least one hardware processor is further configured to:
obtain recorded audio data captured from the second device;
determine that the recorded audio data comprises a spoken command to join the meeting; and
send meeting call-in information to the second device that enables the second device to connect to the meeting via a phone call or videoconference.

6. The system of claim 1, wherein the notification is associated with an alarm previously set by the user to a certain time.

7. The system of claim 1, wherein the notification comprises a reminder to the user to complete a task.

8. A system comprising:
a device profile database that identifies smart speakers associated with a user, wherein the smart speakers associated with the user include a first smart speaker and a second smart speaker that are located remotely from each other; and
at least one hardware processor in communication with the device profile database and configured to execute computer-executable instructions to at least:
obtain, over a network, a first indication of user presence associated with the first smart speaker, wherein the first indication of user presence identifies a first time that the first smart speaker (a) obtained voice input via a microphone of the first smart speaker or (b) detected movement;
obtain, over the network, a second indication of user presence associated with the second smart speaker, wherein the second indication of user presence identifies a second time at which input detected by the second smart speaker suggests that the user was located in physical proximity to the second smart speaker;
identify a notification to be audibly presented to the user;
determine that the user is more likely to be currently located in physical proximity of the second smart speaker than the first smart speaker based on a comparison of the first time and the second time; and send an instruction, to the second smart speaker over the network, that causes the second smart speaker to audibly present the notification.

9. The system of claim 8, wherein the first smart speaker and second smart speaker are located in different rooms of a home of the user.

10. The system of claim 8, wherein the first smart speaker is located in a home associated with the user and the second smart speaker is located in an office associated with the user.

11. The system of claim 8, wherein the first interaction information is sent to the system by the first smart speaker as a result of the first smart speaker obtaining voice input via the microphone of the first smart speaker, and wherein the at least one hardware processor is further configured to determine that the voice input comprises speech spoken by the user.

12. The system of claim 8, wherein the first interaction information is sent to the system by the first smart speaker as a result of the first smart speaker detecting movement near the first smart speaker using a camera or motion sensor.

13. The system of claim 8, wherein the second interaction information is sent to the system by the second smart speaker as a result of the second smart speaker determining that a mobile computing device associated with the user is in physical proximity of the second smart speaker.

14. The system of claim 13, wherein the mobile computing device is determined to be in physical proximity of the second smart speaker based on a beaconing signal, radio-frequency identification, near-field communication, geolocation data, or a connection to a wireless network.

15. A computer-implemented method comprising:
as implemented by one or more computing devices configured with specific executable instructions,
obtaining a first indication of user presence associated with a first device, wherein the first indication of user presence identifies a first time that a user was detected in proximity of the first device;
obtaining a second indication of user presence associated with a second device, wherein the second indication of user presence identifies a second time that the user was detected in proximity of the second device;
identifying a notification to be presented to the user;
determining that the user is more likely to be currently located in physical proximity of the second device than the first device based on a comparison of the first time and the second time; and
causing the second device to present the notification.

16. The computer-implemented method of claim 15, wherein determining that the user is more likely to be currently located in physical proximity of the second device than the first device is based further on a first confidence level associated with the first indication and a second confidence level associated with the second indication.

17. The computer-implemented method of claim 15 further comprising determining that the user is more likely to be currently located in physical proximity of the second device than the first device based in further part on a type of presence detection associated with the second indication of user presence.

18. The computer-implemented method of claim 17 further comprising:
obtaining an indication from the second device that the user responded to the notification; and based on the indication, increasing a weight associated with the type of type of presence detection for use in subsequent user presence determinations associated with the user.

19. The computer-implemented method of claim 17, wherein the type of presence detection comprises motion detection, beaconing, or speech detection.

20. The computer-implemented method of claim 15, wherein the first device comprises at least one of a smart speaker, smart appliance, mobile phone, tablet computing device, desktop computing device, laptop computing device, in-car device, or a wearable device.

* * * * *